United States Patent
Sun et al.

(10) Patent No.: US 10,106,431 B2
(45) Date of Patent: Oct. 23, 2018

(54) METHOD FOR MAKING ANODE ACTIVE MATERIAL OF LITHIUM ION BATTERY

(71) Applicants: Tsinghua University, Beijing (CN); HON HAI PRECISION INDUSTRY CO., LTD., New Taipei (TW)

(72) Inventors: Li Sun, Beijing (CN); Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 429 days.

(21) Appl. No.: 13/925,779

(22) Filed: Jun. 24, 2013

(65) Prior Publication Data
US 2014/0308200 A1    Oct. 16, 2014

(30) Foreign Application Priority Data
Apr. 12, 2013  (CN) .................. 2013 1 01272564

(51) Int. Cl.
*C01D 15/02*  (2006.01)
*C01G 23/00*  (2006.01)
(Continued)

(52) U.S. Cl.
CPC ........... *C01D 15/02* (2013.01); *C01G 23/005* (2013.01); *H01M 4/485* (2013.01); *C01P 2002/32* (2013.01); *C01P 2002/72* (2013.01); *C01P 2004/04* (2013.01); *C01P 2004/32* (2013.01); *C01P 2004/62* (2013.01); *C01P 2004/64* (2013.01); *C01P 2006/12* (2013.01); *C01P 2006/16* (2013.01); *C01P 2006/17* (2013.01); *H01M 10/0525* (2013.01)

(58) Field of Classification Search
CPC .... C01G 23/006; C01G 23/005; C01D 15/02; H01M 4/485; H01M 10/0525; C01P 2002/32; C01P 2002/72; C01P 2004/04; C01P 2004/32; C01P 2004/62; C01P 2004/64; C01P 2006/12; C01P 2006/16; C01P 2006/17
USPC ............................................ 423/598, 594.15
See application file for complete search history.

(56) References Cited

FOREIGN PATENT DOCUMENTS

| CN | 100426568 | 10/2008 |
|---|---|---|
| CN | 101656310 | 2/2010 |

(Continued)

OTHER PUBLICATIONS

CN 1022983319A (Machine Translation).*
(Continued)

*Primary Examiner* — James Fiorito
(74) *Attorney, Agent, or Firm* — ScienBiziP, P.C.

(57) ABSTRACT

A method for making an anode active material of a lithium ion battery is provided. In the method, a tetrabutyl titanate solution and a water solution of lithium hydroxide is provided. The tetrabutyl titanate solution is incrementally added into the water solution of lithium hydroxide to react with the water solution of lithium hydroxide in an alkaline environment to obtain a mixed precipitate. The mixed precipitate is calcined to synthesize a spinel type lithium titanate. The spine lithium titanate is used as the anode active material to improve an electrochemical performance of the lithium ion battery.

13 Claims, 9 Drawing Sheets

(51) Int. Cl.
*H01M 4/485* (2010.01)
*H01M 10/0525* (2010.01)

(56) References Cited

FOREIGN PATENT DOCUMENTS

CN   101826615       9/2010
CN   102983319 A  *  3/2013
CN   103050662 A  *  4/2013

OTHER PUBLICATIONS

CN 103050662A (Machine Translation).*
CN 101826615B (Machine Translation).*
Lide, CRC Handbook of Chemistry and Physics, 2003, CRC Press, 84th, 8-114.*

* cited by examiner

METHOD FOR MAKING ANODE ACTIVE MATERIAL OF LITHIUM ION BATTERY

CROSS-REFERENCE TO RELATED APPLICATIONS

This application claims all benefits accruing under 35 U.S.C. § 119 from China Patent Application No. 201310127256.4, filed on Apr. 12, 2013, in the China Intellectual Property Office, the contents of which are hereby incorporated by reference.

BACKGROUND

1. Technical Field

The present disclosure relates to a method for making an anode active material for a lithium ion battery.

2. Description of Related Art

Spinel type lithium titanate (e.g., $Li_4Ti_5O_{12}$), as a "zero strain" material used as an active material in the anode electrode of a lithium ion battery exhibits a high diffusion rate of lithium ions and a high energy conversion efficiency.

The lithium titanate is usually synthesized at a calcining temperature higher than about 600° C. for a capacity requirement if used as an anode active material of the lithium ion battery. However, sizes of crystalline grains of the lithium titanate are large under such a high temperature. An electrochemical performance of the lithium ion battery may be restricted if the calcining temperature is used.

What is needed, therefore, is to provide a method for making a lithium titanate as an anode active material of a lithium ion battery which can synthesize at a low calcining temperature and have a good electrochemical performance when used in the lithium ion battery.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings. It should be noted that references to "another," "an," or "one" embodiment in this disclosure are not necessarily to the same embodiment, and such references mean at least one.

Figure 1:
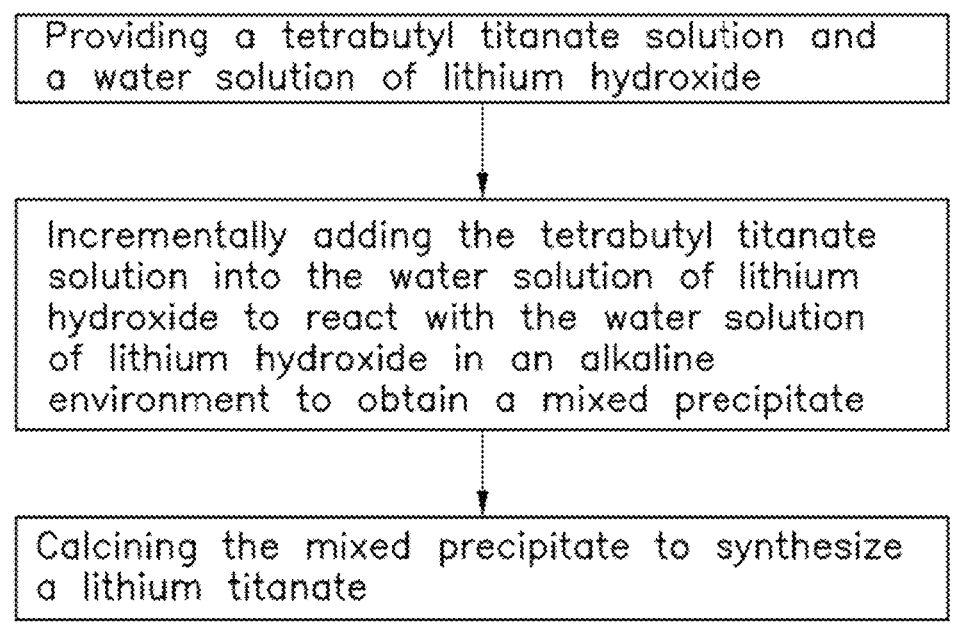
FIG. 1 is a flow chart of an embodiment of a method for making an anode active material of a lithium ion battery.

Referring to FIG. 1, one embodiment of a method for making an anode active material of a lithium ion battery comprising the following steps:

S1, providing a tetrabutyl titanate solution and a water solution of lithium hydroxide;

S2, incrementally adding the tetrabutyl titanate solution into the water solution of lithium hydroxide to react with the water solution of lithium hydroxide in an alkaline environment to obtain a mixed precipitate; and S3, calcining the mixed precipitate to synthesize a lithium titanate.

In step S1, the tetrabutyl titanate solution includes an organic solvent and tetrabutyl titanate ($TiO(C_4O_9)_4$)) dissolved in the organic solvent. The tetrabutyl titanate does not react with the organic solvent. The organic solvent can be a kind of alcohol, such as at least one of absolute ethanol, methanol, n-propanol, isopropanol, n-butanol, and isobutanol. In one embodiment, the organic solvent is the absolute ethanol. A concentration of the tetrabutyl titanate in the tetrabutyl titanate solution can be in a range from about 0.1 mols per liter (mol/L) to about 4 mol/L. In one embodiment, the concentration of the tetrabutyl titanate in the tetrabutyl titanate solution is in a range from about 1 mol/L to about 3 mol/L. In one embodiment, the concentration of the tetrabutyl titanate in the tetrabutyl titanate solution is about 1.7 mol/L.

The water solution of lithium hydroxide is alkaline. In one embodiment, the water solution of lithium hydroxide is strongly alkaline. Lithium ions ($Li^+$) and hydroxyl ions ($OH^-$) can be dissociated in the water solution of lithium hydroxide to facilitate a reaction with the tetrabutyl titanate. A pH value of the water solution of lithium hydroxide can be in a range from about 11 to about 14. In one embodiment, the pH value is in a range from about 13 to about 14. A concentration of the lithium hydroxide in the water solution of lithium hydroxide can be in a range from about 0.1 mol/L to about 4 mol/L. In one embodiment, the concentration of the lithium hydroxide in the water solution of lithium hydroxide is in a range from about 1 mol/L to about 3 mol/L. In one embodiment, the concentration of the lithium hydroxide in the water solution of lithium hydroxide is about 2 mol/L.

A molar ratio represented as Li:Ti between the lithium hydroxide and the tetrabutyl titanate can be in a range from about 4:5 to about 5:5. In one embodiment, the molar ratio is about 4:5.

In step S2, a process of incrementally adding the tetrabutyl titanate solution to the water solution of lithium hydroxide is different from a process of one-time adding the total stoichiometric tetrabutyl titanate solution into the water solution of lithium hydroxide. During the gradually adding of the tetrabutyl titanate solution, the lithium hydroxide is abundant to the tetrabutyl titanate in the water. The tetrabutyl titanate can be mixed with the water solution of lithium hydroxide in the alkaline environment by the step of incrementally adding. Therefore, the tetrabutyl titanate can react with the lithium hydroxide to obtain the mixed precipitate. The mixed solution after the reaction can be decreased to be neutral. In other words, the pH value of the mixed solution after the reaction ranges from about 6 to about 7.

The step S2 can be proceeded in an open environment. Therefore, the tetrabutyl titanate and the lithium hydroxide can be reacted under an ordinary pressure (e.g., one atmosphere) without increasing a reaction pressure.

The mixed precipitate is in a powdered form. The mixed precipitate mainly includes a lithium titanate precursor. The lithium titanate precursor is a lithium titanium oxide (Li—Ti—O), which is not lithium titanate ($Li_4Ti_5O_{12}$). A crystalline structure of the lithium titanium oxide is different from the crystalline structure of the lithium titanate. The lithium titanium oxide is only a precursor to synthesize the lithium titanate. The incrementally adding step can make the tetrabutyl titanate be in the strongly alkaline environment substantially all the time when adding to the water solution of lithium hydroxide. Therefore, a reaction product between the tetrabutyl titanate and the lithium hydroxide is mainly constituted by the lithium titanium oxide. The lithium titanium oxide preformed can reduce a calcining temperature for the mixed precipitate. In addition, the lithium titanate precursor also includes lithium carbonate ($Li_2CO_3$) and titanium dioxide ($TiO_2$) with a small amount. The incrementally adding can be adding a drop of the tetrabutyl titanate solution at a time into the water solution of lithium hydroxide. In addition, the tetrabutyl titanate solution also can be added to the water solution of lithium hydroxide at a small flow rate. The flow rate can be in a range from about 1 milliliter per minute to about 5 milliliters per minute. In one embodiment, the tetrabutyl titanate solution is dropwise added to and reacts with the water solution of lithium hydroxide to obtain a white mixed precipitate, the white mixed precipitate includes the lithium titanium oxide ($LiTiO_2$), $Li_2CO_3$, and $TiO_2$.

The step S2 can be proceeded at a temperature above the room temperature and below 100° C. In one embodiment, the water solution of lithium hydroxide can be warmed before the tetrabutyl titanate solution added thereto. The warming step can facilitate a formation of the lithium titanate precursor mainly constituted by the lithium titanium oxide (Li—Ti—O), whereby the calcining temperature for forming a spinel type lithium titanate can be further reduced. A warming temperature for the water solution of lithium hydroxide can be smaller than 100° C. In one embodiment, the warming temperature is in a range from about 40° C. to about 80° C. In one embodiment, the warming temperature is in a range from about 50° C. to about 80° C. In one embodiment, the warming temperature is about 80° C.

The method can further including a stirring step during the process of the tetrabutyl titanate solution being incrementally added to the water solution of lithium hydroxide. A stirring velocity can be in a range from about 100 rounds per minute (r/m) to about 1000 r/m. The stirring step can facilitate the tetrabutyl titanate thoroughly mixing and reacting with the lithium hydroxide. In one embodiment, the stirring step lasts the whole process of the incrementally adding.

The mixed precipitate further can be separated and purified after the step S2. The mixed precipitate can be filtered out and dried. A drying time period can be in a range from about 10 hours to about 30 hours. In one embodiment, the mixed precipitate is dried at about 60° C. for about 24 hours.

In step S3, the calcining temperature can be in a range from about 350° C. to about 900° C. In one embodiment, the calcining temperature can be in a range from about 350° C. to about 500° C. In one embodiment, the calcining temperature is greater than 350° C. In one embodiment, the calcining temperature is about 400° C. Because the lithium titanate precursor mainly constituted by the lithium titanium oxide (Li—Ti—O) is pre-generated in the step S2, a relatively low calcining temperature ranging from about 350° C. to about 500° C., compared with the calcining temperature used in the prior art, can be used to achieve the spinel type lithium titanate. The spinel type lithium titanate can be in a particle form including a plurality of lithium titanate particles. The plurality of lithium titanate particles has a uniform diameter. The diameter of the plurality of lithium titanate particles is in a range from about 50 nanometers to about 100 nanometers. Each of the plurality of lithium titanate particles is a porous structure including a plurality of micropores and mesopores. An aperture of the porous structure is in a range from about 2 nanometers to about 10 nanometers.

Example 1

About 0.05 mol of the tetrabutyl titanate is dissolved in about 30 ml of absolute ethanol to form a clear tetrabutyl titanate solution. About 0.04 mol of the lithium hydroxide is dissolved into about 20 ml of deionized water to form the water solution of lithium hydroxide. The water solution of lithium hydroxide is warmed to about 80° C. The tetrabutyl titanate solution is then dropwise added in the warmed water solution of lithium hydroxide under one standard atmospheric pressure and stirred quickly. A plurality of white and loose mixed precipitate powders is instantaneously formed. The pH value of the mixed solution of the tetrabutyl titanate solution and the water solution of lithium hydroxide after reacted is about 6 to about 7. The mixed precipitate is separated out and dried at about 60° C. for about 24 hours. The dried mixed precipitate is then calcined at about 400° C. to obtain the spinel type lithium titanate particles.

Example 2

The method of the example 2 is substantially the same as the method of the example 1, except that the calcining temperature of the mixed precipitate of the example 2 is about 600° C. to synthesize lithium titanate particles.

Example 3

The method of the example 3 is substantially the same as the method of the example 1, except that the calcining temperature of the mixed precipitate of the example 3 is about 800° C. to synthesize lithium titanate particles.

Figure 2:
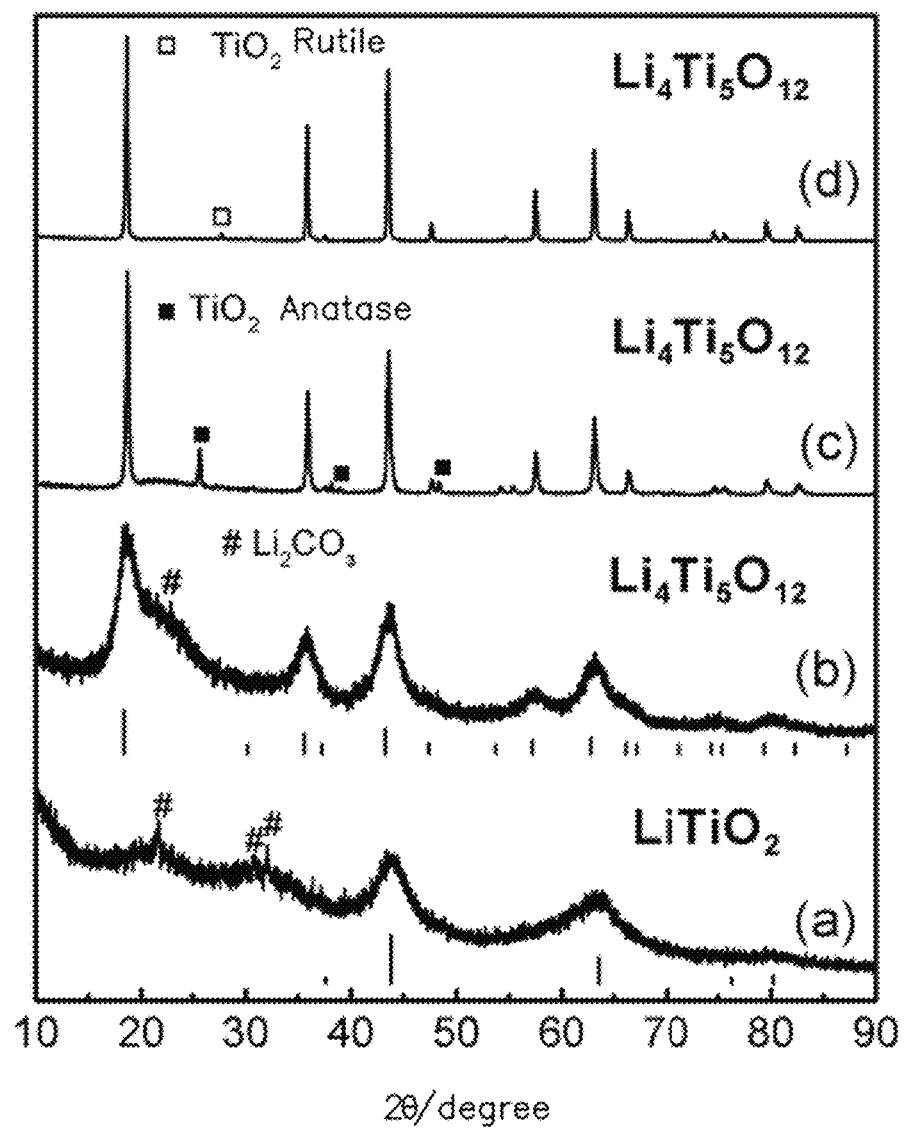
FIGS. 2(a), 2(b), 2(c), and 2(d) show graphs of X-ray diffraction patterns of a mixed precipitate synthesized by example 1, lithium titanate synthesized by example 1, the lithium titanate synthesized by example 2, and the lithium titanate synthesized by example 3.

Ingredients of the mixed precipitate synthesized by the example 1 and the lithium titanate particles synthesized by the examples 1, 2, and 3 are examined. Referring to FIG. 2(a), the major ingredient of the mixed precipitate is $LiTiO_2$ and $Li_2CO_3$. Referring to FIG. 2(b), the major ingredient of the lithium titanate particles obtained under the calcining temperature of about 400° C. is well crystallized spinel type lithium titanate accompanying by a slight amount of impurities of $Li_2CO_3$ phase. Referring to FIG. 2(c), the major ingredient of the lithium titanate particles obtained under the calcining temperature of about 600° C. is spinel type lithium titanate accompanying by a small amount of anatase $TiO_2$. Referring to FIG. 2(d), the major ingredient of the particles obtained under the calcining temperature of about 800° C. is spinel type lithium titanate accompanying by a small amount of rutile $TiO_2$.

Figure 3:
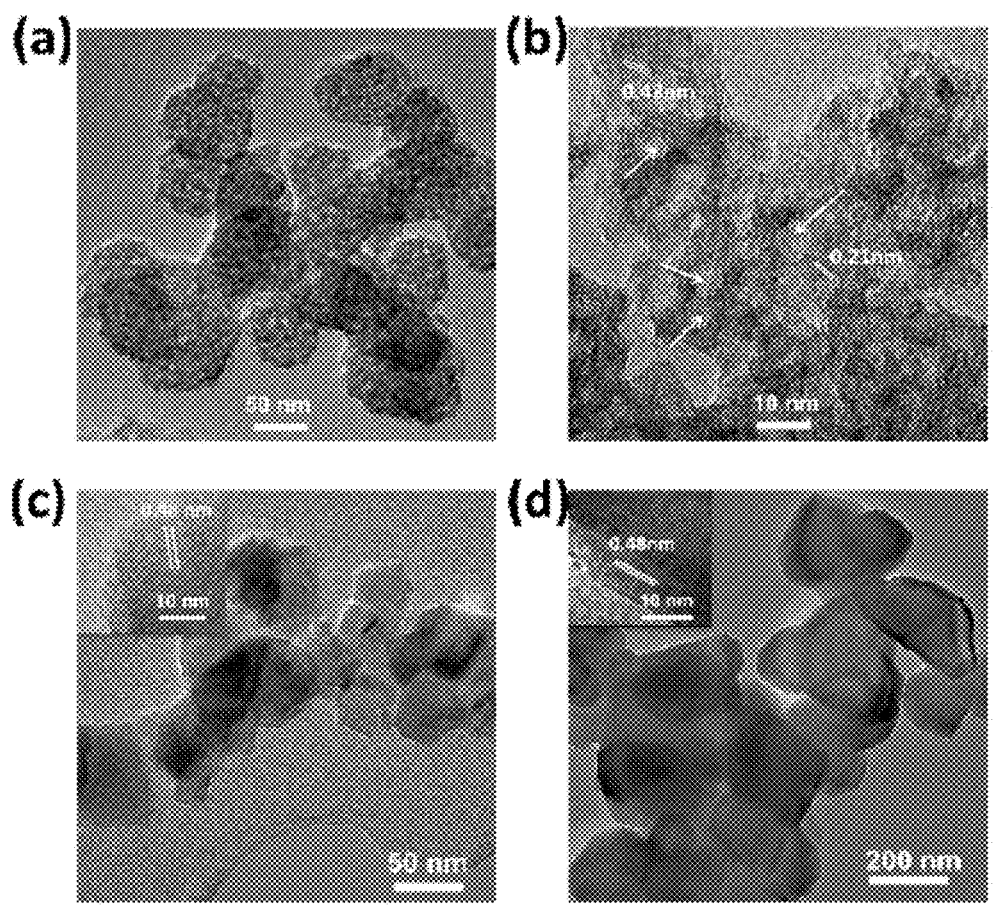
FIGS. 3(a), 3(b), 3(c), and 3(d) show photos orderly of a transmission electron microscope (TEM) image of the lithium titanate of example 1, a high resolution transmission electron microscope (HRTEM) image of example 1, the TEM image of the lithium titanate of example 2 with the HRTEM image thereof as an inset, and the TEM image of the lithium titanate of example 3 with the HRTEM image as the inset.

Referring to FIG. 3, the lithium titanate particles synthesized in the example 1 are in the form of nanospheres with a uniform diameter ranging from about 50 nanometers to about 100 nanometers. The nanospheres are assembled by densely packed interconnected nanoparticles with a diameter smaller than 10 nanometers. Referring to positions of arrows indicated in the FIG. 3(b), nano-sized pores can be found within the lithium titanate nanospheres. Two typical lattice distances are marked in the image of FIG. 3(b) as 0.48 nanometers and 0.21 nanometers, corresponding to the (111) and (400) planes of the spinel lithium titanate.

Referring to insets of FIG. 3(c) and FIG. 3(d), both two kinds of lithium titanate particles calcined at about 600° C. and 800° C. are identified as well-crystallized spinel type lithium titanate with a lattice distance of 0.48 nanometers. In addition, the lithium titanate particles synthesized in the example 2 and example 3 have a relatively large diameter and have no obvious pores. The diameter of the lithium titanate particles synthesized in the example 2 is in a range from about 50 nanometers to about 100 nanometers. The diameter of the lithium titanate particles synthesized in the example 3 is in a range from about 100 nanometers to about 200 nanometers.

A specific surface area of the lithium titanate particles synthesized in the example 1 is further measured by Brunauer-Emmett-Teller (BET) measurements. According to the BET results, the lithium titanate particles synthesized in the example 1 exhibited a large specific surface area of about 142 square meters per gram ($m^2/g$), which is much higher than those of the lithium titanate particles synthesized in the examples 2 and 3. The specific surface area of the lithium titanate particles of the example 2 is about 18 $m^2/g$ and the specific surface area of the lithium titanate particles of the example 3 is about 5.6 $m^2/g$.

Figure 4:
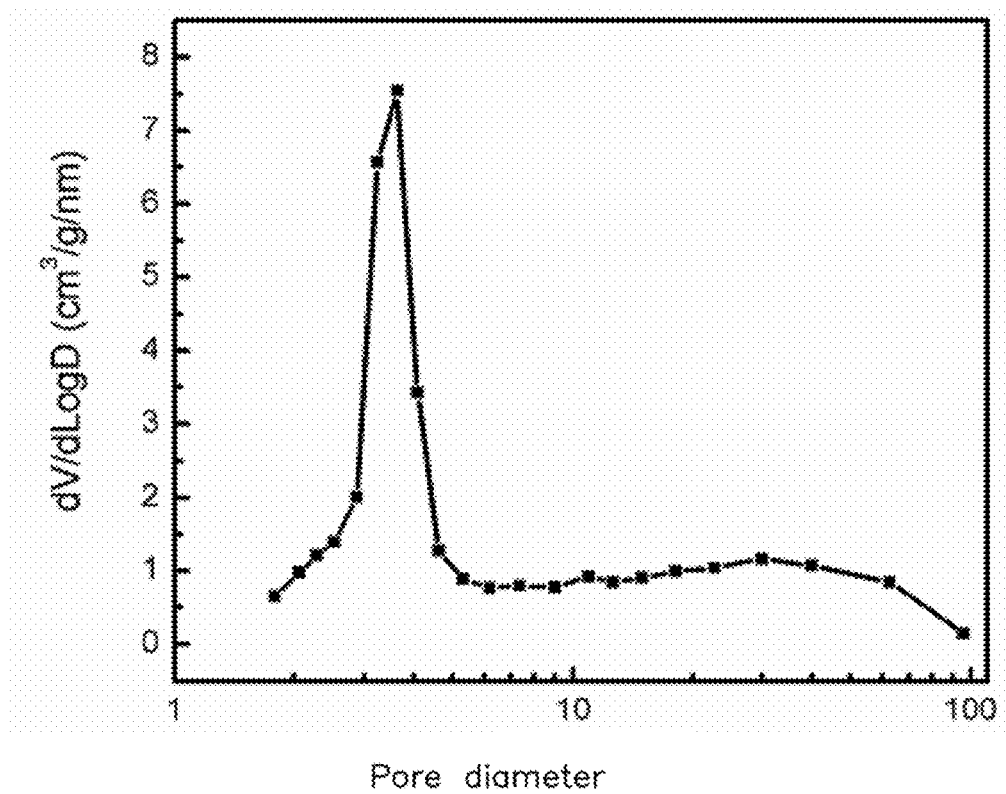
FIG. 4 is a pore diameter distribution diagram of the lithium titanate of example 1.

Referring to FIG. 4, pores in the lithium titanate particles of the example 1 have diameters distributed from about 2 nanometers to about 10 nanometers. The distribution curve exhibits a maximum peak at the pore with the diameter of about 3.6 nanometers which is caused by the porous structure of the lithium titanate particles.

Figure 5:
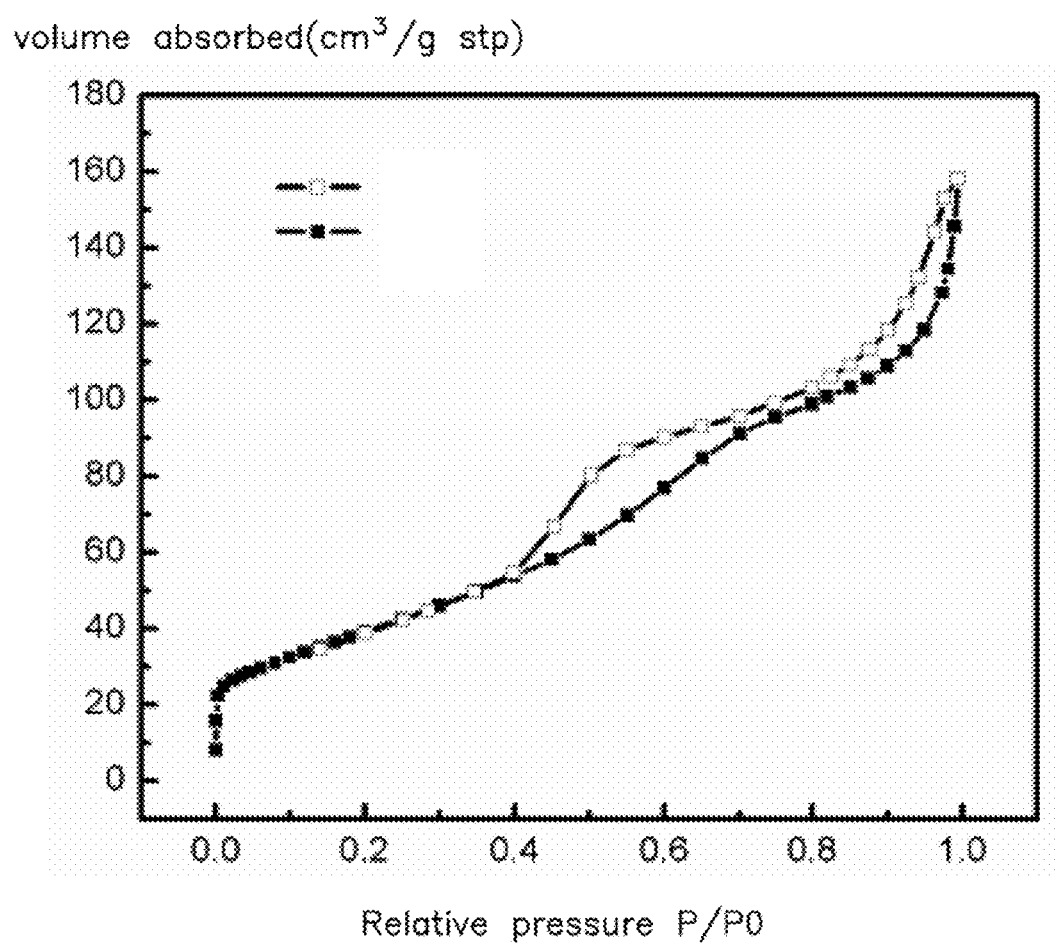
FIG. 5 is a graph showing a gas ($N_2$) adsorption-desorption isotherm loop of the lithium titanate of example 1.

Referring to FIG. 5, a distinctive hysteresis is found in a relative pressure ($P/P_0$) range of 0.3 to 1.0, which can be attributed to the plurality of mesopores and micropores of the lithium titanate particles of the example 1.

The lithium titanate particles of examples 1-3 and a kind of commercial lithium titanate particles are used as four samples of anode active materials of lithium ion batteries separately to test their electrochemical performances. The commercial lithium titanate particles have no pore and a diameter thereof is about 730 nanometers (labeled as LTO-commercial). The lithium titanate particles of examples 1-3 are labeled as LTO-400, LTO-600, and LTO-800 respectively. Four examples are used as anode active materials and assembled to form four lithium ion batteries respectively. Specifically, each of the four samples is mixed with a conductive agent and a binder to form a slurry and deposited on an anode current collector to form an anode electrode. Each anode electrode is assembled with a pure lithium metal foil as a cathode electrode, a separator, and an electrolyte to form one corresponding lithium ion battery.

Figure 6:
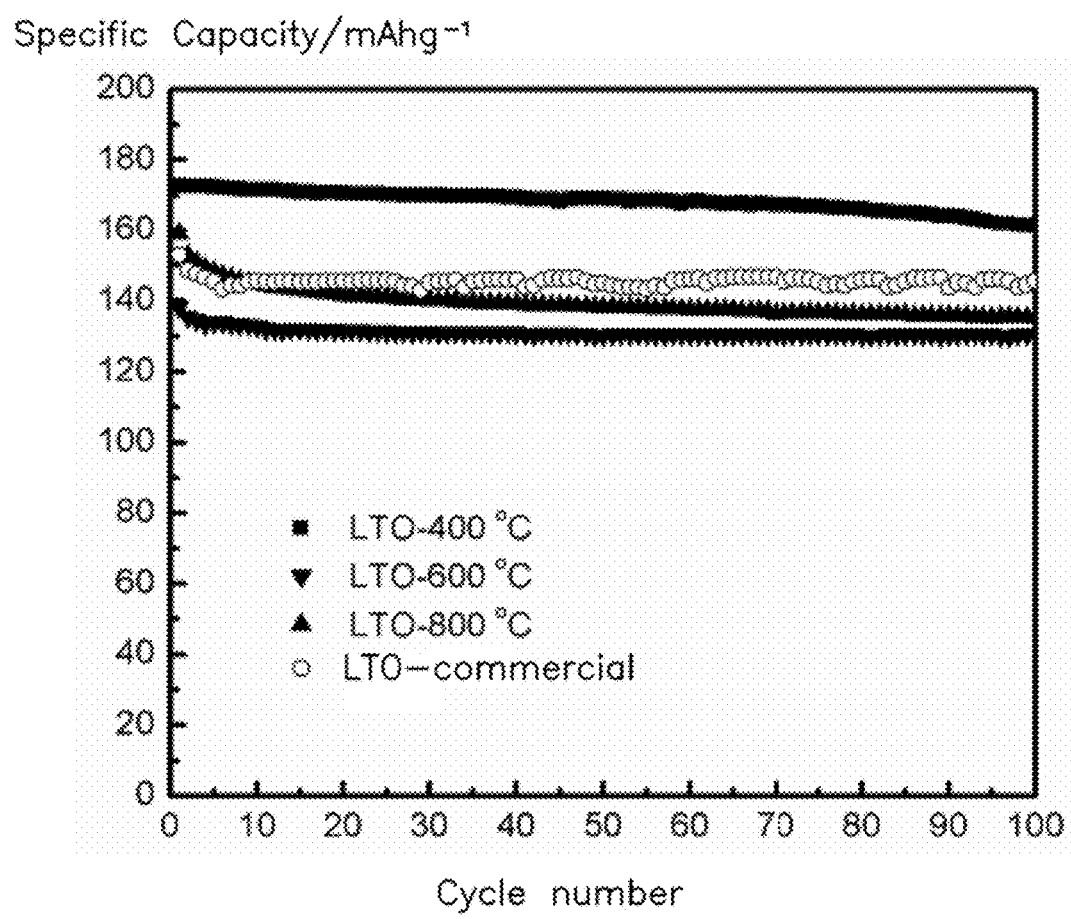
FIG. 6 is a graph comparing four cycling performance curves of lithium ion batteries at a constant rate by using the lithium titanate synthesized by examples 1-3, and a commercial lithium titanate.
Figure 7:
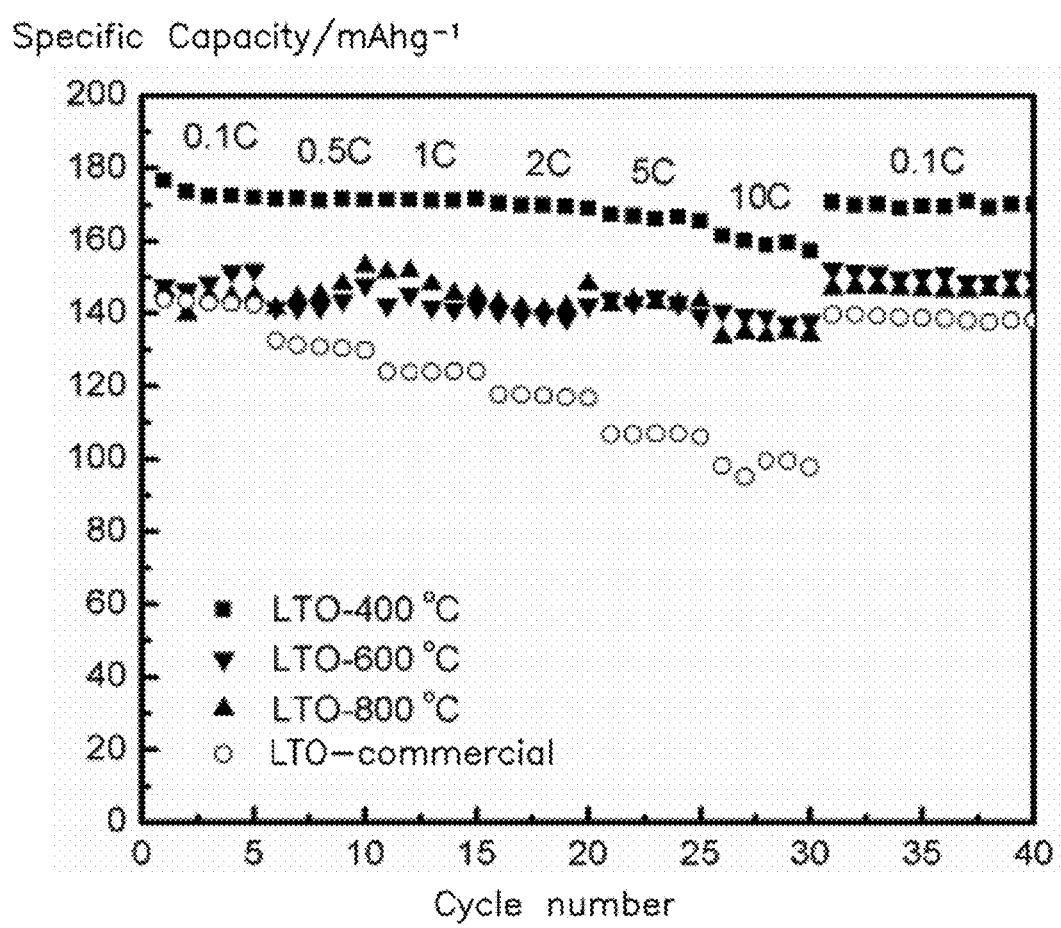
FIG. 7 is a graph comparing cycling performance curves of the lithium ion batteries at different rates by using the lithium titanate synthesized by examples 1-3, and a commercial lithium titanate.

Referring to FIG. 6, cycling performances of the four lithium ion batteries fabricated by the four samples are respectively tested at a constant rate of about 0.5 C. It is shown that the sample LTO-400 exhibits a good cycling stability and high specific capacity compared with the other three samples. Referring to FIG. 7, samples LTO-400, LTO-600, and LTO-800 all exhibit better rate performances and higher capacity retention than the sample LTO-commercial when cycling upon different current rates of 0.1 C, 0.5 C, 1 C, 2 C, 5 C, and 10 C. In addition, the sample LTO-400 exhibits the best rate performance and cycling stability of the four samples.

Comparative Example 1

The method of the comparative example 1 is substantially the same as the method of example 1, except that an order of the tetrabutyl titanate solution and the water solution of lithium hydroxide added with each other is changed. In the comparative example 1, the water solution of lithium hydroxide is dropwise added into the tetrabutyl titanate solution to react to form a mixed precipitate 1.

Figure 8:
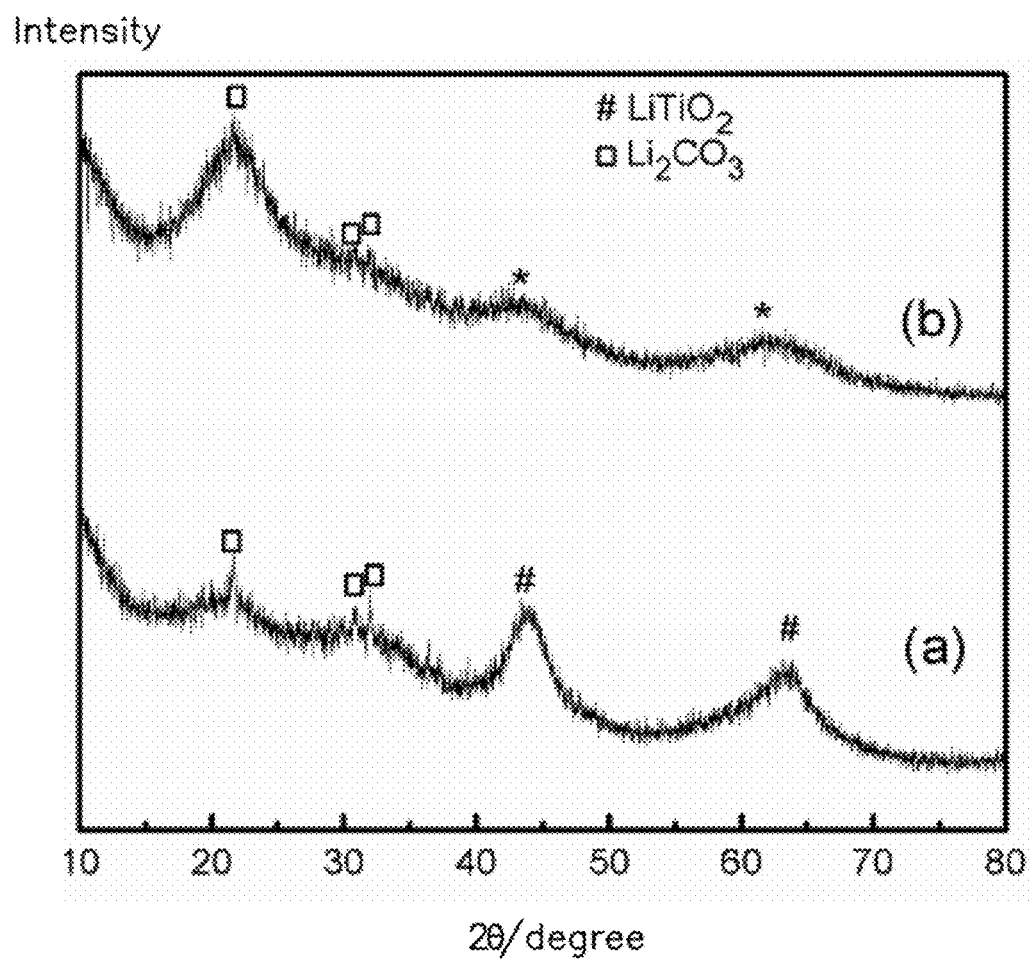
FIG. 8 is a graph comparing XRD patterns of a mixed precipitate 1 synthesized in the comparative example 1 and the mixed precipitate synthesized in the example 1.

The mixed precipitate 1 is further tested via the XRD measurement. Referring to FIG. 8(b), the major ingredient of the mixed precipitate 1 is $Li_2CO_3$ and containing other impurities (labeled as *). The lithium titanium oxide (Li—Ti—O, such as $LiTiO_2$) is not synthesized in the mixed precipitate 1. The test result indicates that if the order of the tetrabutyl titanate and the water solution of lithium hydroxide added with each other is changed, the reaction between the lithium hydroxide and the tetrabutyl titanate cannot synthesize the lithium titanate precursor with the lithium titanium oxide as main ingredient (such as $LiTiO_2$). If to synthesize the spinel type lithium titanate in the comparative example 1, a higher calcining temperature than that of the example 1 should be required.

Comparative Example 2

The method of the comparative example 2 is substantially the same as the method of example 1, except that the tetrabutyl titanate solution is one-time added to the water solution of lithium hydroxide to react to form a mixed precipitate 2.

Figure 9:
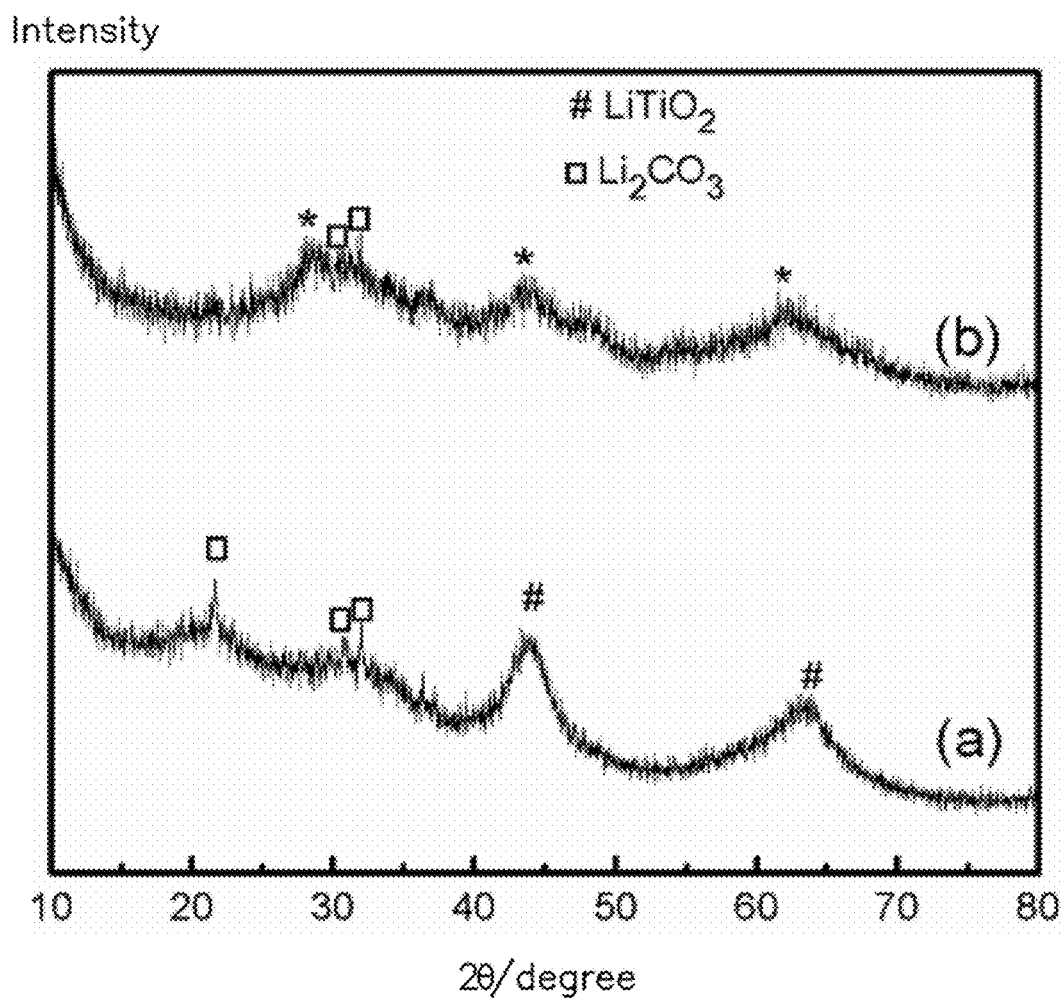
FIG. 9 is a graph comparing XRD patterns of a mixed precipitate 2 synthesized in the comparative example 2 and the mixed precipitate synthesized in the example 1.

The mixed precipitate 2 is further tested via the XRD measurement. Referring to FIG. 9(b), the major ingredient of the mixed precipitate 2 is $Li_2CO_3$ and containing other impurities (labeled as *). The lithium titanium oxide (Li—Ti—O, such as $LiTiO_2$) is not synthesized in the mixed precipitate 2. The test result indicates that if the tetrabutyl titanate solution is one-time added to the water solution of lithium hydroxide, the reaction between the lithium hydroxide and the tetrabutyl titanate can not synthesize the lithium titanate precursor with the lithium titanium oxide as main ingredient (such as $LiTiO_2$). If to synthesize the spinel type lithium titanate in the comparative example 2, a higher calcining temperature than that of the example 1 should be required.

The lithium titanate fabricated by the method has a small and uniform diameter and provides a highly porous structure. Such porous structure is preferred as an anode active material of the lithium ion battery as it provides a large electrode-electrolyte interfacial area and an efficient transportation of lithium ions to improve the electrochemical performance of the lithium ion battery.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making an anode active material of a lithium ion battery comprising:
    providing a tetrabutyl titanate solution consisting of dissolved tetrabutyl titanate in an organic solvent;
    providing a lithium hydroxide water solution consisting of dissolved lithium hydroxide in water;
    adding, dropwise, the tetrabutyl titanate solution into the lithium hydroxide water solution to react with the lithium hydroxide water solution in an alkaline environment to obtain a mixed precipitate, wherein the mixed precipitate comprises a lithium titanium oxide; and
    calcining the mixed precipitate to synthesize a plurality of lithium titanate particles.

2. The method of claim 1, wherein the lithium titanium oxide comprises $LiTiO_2$.

3. The method of claim 1, wherein the organic solvent is selected from the group consisting of absolute ethanol, methanol, n-propanol, isopropanol, n-butanol, isobutanol, and combinations thereof.

4. The method of claim 3, wherein a concentration of the tetrabutyl titanate in the tetrabutyl titanate solution is in a range from about 0.1 mol/L to about 4 mol/L.

5. The method of claim 1, wherein a concentration of lithium hydroxide in the lithium hydroxide water solution is in a range from about 0.1 mol/L to about 4 mol/L.

6. The method of claim 1, wherein a pH value of the lithium hydroxide water solution is in a range from about 11 to about 14.

7. The method of claim 1 further comprising a stirring during a process of the tetrabutyl titanate solution being incrementally added to the lithium hydroxide water solution, a stirring velocity is in a range from about 100 rounds per minute to about 1000 rounds per minute.

8. The method of claim 1, wherein the step of adding dropwise is performed under one standard atmospheric pressure.

9. A method for making an anode active material of a lithium ion battery comprising:
    providing a tetrabutyl titanate solution consisting of dissolved tetrabutyl titanate in an organic solvent;
    providing a lithium hydroxide water solution consisting of dissolved lithium hydroxide in water;
    incrementally adding the tetrabutyl titanate solution into the lithium hydroxide water solution to react with the lithium hydroxide water solution in an alkaline environment to obtain a mixed precipitate, wherein the mixed precipitate comprises $LiTiO_2$; and
    calcining the mixed precipitate to synthesize a plurality of lithium titanate particles.

10. The method of claim 9, wherein the incrementally adding is adding a drop of the tetrabutyl titanate solution at a time into the lithium hydroxide water solution.

11. The method of claim 9, wherein a molar ratio represented as Li:Ti between the lithium hydroxide and the tetrabutyl titanate is in a range from about 4:5 to about 5:5.

12. The method of claim 9, wherein a pH value of a mixed solution of the tetrabutyl titanate solution and the lithium hydroxide water solution after reaction is about 6 to about 7.

13. The method of claim 1, wherein a pH value of a mixed solution of the tetrabutyl titanate solution and the lithium hydroxide water solution after reaction is about 6 to about 7.

* * * * *